US011887050B2

(12) United States Patent
Li et al.

(10) Patent No.: US 11,887,050 B2
(45) Date of Patent: Jan. 30, 2024

(54) SERVER, RESERVATION CONFIRMATION METHOD, AND PROGRAM

(71) Applicant: Rakuten Group, Inc., Tokyo (JP)

(72) Inventors: Yuxi Li, Tokyo (JP); Keisuke Sasaki, Tokyo (JP); Kota Wakayama, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 3 days.

(21) Appl. No.: 17/363,341

(22) Filed: Jun. 30, 2021

(65) Prior Publication Data

US 2022/0138673 A1 May 5, 2022

(30) Foreign Application Priority Data

Oct. 30, 2020 (JP) ................................. 2020-182817

(51) Int. Cl.
*G06Q 10/087* (2023.01)
*H04L 51/224* (2022.01)
*G06Q 20/32* (2012.01)

(52) U.S. Cl.
CPC ......... *G06Q 10/087* (2013.01); *H04L 51/224* (2022.05); *G06Q 20/3255* (2013.01)

(58) Field of Classification Search
CPC . G06Q 10/087; G06Q 20/3255; H04L 51/224
See application file for complete search history.

(56) References Cited

U.S. PATENT DOCUMENTS

| 6,484,196 | B1 * | 11/2002 | Maurille | H04L 51/04 |
| | | | | 370/260 |
| 7,689,469 | B1 * | 3/2010 | Mesaros | G06Q 30/0601 |
| | | | | 705/26.1 |
| 10,558,506 | B1 * | 2/2020 | Min | G06Q 30/0643 |
| 10,776,723 | B1 * | 9/2020 | Hopkins | G06Q 30/0255 |
| 2004/0205005 | A1 * | 10/2004 | Matsunaga | G06Q 30/0605 |
| | | | | 705/26.2 |
| 2014/0180865 | A1 * | 6/2014 | Argue | G06Q 30/0633 |
| | | | | 705/26.7 |
| 2014/0289644 | A1 * | 9/2014 | Clarke | G06F 3/048 |
| | | | | 715/752 |
| 2016/0343057 | A1 * | 11/2016 | Andon | G06F 16/24578 |

(Continued)

FOREIGN PATENT DOCUMENTS

JP          5241951 B1    7/2013

*Primary Examiner* — Florian M Zeender
*Assistant Examiner* — Vanessa Deligi
(74) *Attorney, Agent, or Firm* — Sughrue Mion, PLLC

(57) ABSTRACT

A server and the like that can provide an opportunity for a user to confirm purchase of a reserved product, which sends a first message including an object for canceling reservation of a reserved product to a user via a message service, enabled to discriminate whether a message has been read, when the product arrives, cancels the reservation when the object is operated in a predetermined time after the first message is marked as read, determines whether the product is in stock when the object remains unoperated for the predetermined time after the first message is marked as read, finalizes purchase of the product when it is determined that the product is in stock, and sends a second message notifying that the product has been sold out to the user when it is determined that the product is out of stock.

11 Claims, 10 Drawing Sheets

(56) References Cited

U.S. PATENT DOCUMENTS

| | | | | |
|---|---|---|---|---|
| 2016/0371674 A1* | 12/2016 | Cho | .................... | G06Q 20/382 |
| 2017/0329615 A1* | 11/2017 | Kahn | ...................... | G06F 9/451 |
| 2019/0036864 A1* | 1/2019 | Reuss | ................... | H04L 63/123 |
| 2021/0019748 A1* | 1/2021 | Hyun | .................... | G06Q 20/20 |

* cited by examiner

FIG. 5

|  | | 232b | 232c | 232d | 232e |
|---|---|---|---|---|---|
| 232a | USER ID | DATE AND TIME OF TRANSMISSION | DATE AND TIME OF READING | STATUS | ... |
| RESERVED PRODUCT ID / Y01A012345 | ABC-D123 | 9/14 10:14 | 9/14 10:15 | PURCHASE FINALIZED | ... |
| | EFG-H567 | 9/14 10:14 | 9/14 10:18 | CANCELED | ... |
| | HHH-H222 | 9/14 10:14 | — | UNREAD | ... |
| | FGH-I678 | 9/14 10:14 | 9/14 12:05 | PURCHASE FINALIZED | ... |
| | BCD-E234 | 9/14 10:14 | — | UNREAD | ... |
| | YYY-Y444 | 9/14 10:14 | 9/14 10:21 | CANCELED | ... |
| | : | : | : | : | ... |

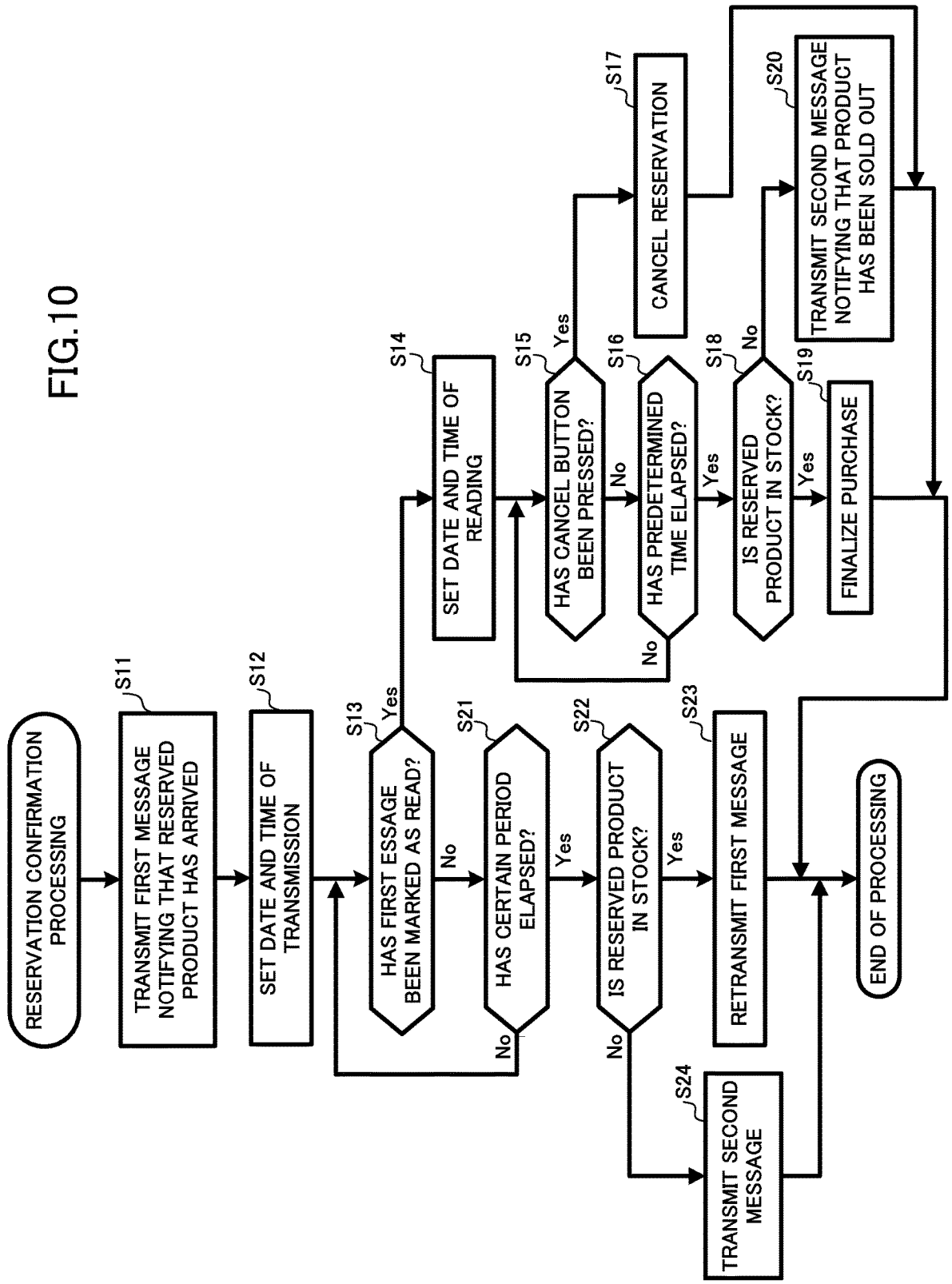

SERVER, RESERVATION CONFIRMATION METHOD, AND PROGRAM

TECHNICAL FIELD

The present disclosure relates to a server, a reservation confirmation method, and a program.

BACKGROUND ART

In recent years, sales sites that conduct electronic commerce are gaining popularity on the Internet. A large-scale sales site (shopping mall site) formed by a collection of various stores or shops (virtual stores or shops), for example, not only handles products and the like in a wide variety of categories (genres) as a whole, but also promotes price competition between the stores, and therefore acquires a large number of users.

In such a sales site, for example, sometimes a rush of orders for a popular product, a seasonal product, or the like occurs, so the product is sold out and goes out of stock in a short period of time. In this case, in the sales site, for example, an arrival notification button is set in place of a purchase button (Add to Cart, or the like) on the product page or the like of the product that is out of stock, so that when the product is restocked in the future, an arrival notification is sent to a user who wishes to receive the notification.

In other words, a user who needs to wait for the product to arrive, but nonetheless wants to purchase the product wishes to receive an arrival notification by pressing the arrival notification button, and tries to purchase the product in response to an arrival notification sent upon restocking of the product.

As a related-art technique of such an arrival notification, Patent Literature 1, for example, discloses the invention of a communication sales system (notification control system) that can ease complication regarding a back-in-stock notification of the product.

In the invention of Patent Literature 1, when the product is already out of stock (when the restocked product has already been sold out) as a user who has received an arrival notification browses a product page by following a link of the arrival notification, the next arrival notification is resent without requiring the user to press the arrival notification button again.

CITATION LIST

Patent Literature

Patent Literature 1: Japanese Patent No. 5241951

SUMMARY OF INVENTION

Technical Problem

Nowadays, a sales site is known to be provided with a purchase reservation button, in place of such an arrival notification button, to allow a user to purchase the product on a first-come, first-served basis without requiring the user to perform no purchase operation when the product is restocked.

In other words, when a user presses the purchase reservation button on the product page or the like of the product that is out of stock, information concerning the user is added to a back-order queue for the product. When the product is restocked, reservation is finalized in sequence from the head of the queue, and the product is shipped to users who have made reservations.

In practice, however, since it often takes a long time for the reserved product to be restocked (more specifically, for each user's turn to come around), some users change their minds about purchase for the reserved product on the way. Especially for a seasonal product or the like, since the period during which the product can be effectively used is limited, users, for example, often want to wait for up to several months, but want to cancel the purchase (want to cancel the reservation) when the users are expected to wait for more than several months.

The moment the user wants to try to cancel the purchase, the reservation (the purchase of the reserved product) can be canceled, but users often do not review the reservation during back orders, and in the actual situation, therefore, most users become aware that they no longer wish to purchase, in response to shipping of the product.

Since such users generally return the received product, a problem is posed not only in terms of incurring an excess shipping cost, but also in terms of causing further delay in arrival of the product at the locations of other users who want the product.

Under such circumstances, a demand has arisen for a technique that can provide an opportunity for a user to confirm purchase of a reserved product.

The present disclosure has been made in consideration of the above-described actual situation, and aims to provide a server, a reservation confirmation method, and a program that can provide an opportunity for a user to confirm purchase of a reserved product.

Solution to Problem

A server according to a first aspect of the present disclosure is provided as a server that uses a message service enabled to discriminate whether a message sent to a destination has been read, the server including:
  a notification device that sends a first message including an object for canceling reservation of a product reserved by a user to the user via the message service when the product arrives;
  a cancellation device that cancels the reservation when the object is operated by the user in a predetermined time after the first message is marked as read;
  a determination device that determines whether the product is in stock when the object remains unoperated for the predetermined time after the first message is marked as read; and
  a finalization device that finalizes purchase of the product by the user when the determination device determines that the product is in stock,
  wherein the notification device sends a second message notifying that the product has been sold out to the user when the determination device determines that the product is out of stock.

In the server according to the above-described aspect, the notification device may send the second message to the user via another message service disabled from discriminating whether a message sent to a destination has been read.

In the server according to the above-described aspect,
  the determination device may determine whether the product is in stock when the first message remains unread for a certain period after the first message is sent to the user, and the notification device may resend the first message to the user when the determination device determines that the product is in stock while the first message is unread.

In the server according to the above-described aspect, when the first message remains unread at a time at which a first period elapses after the notification device sends the first message, and the determination device determines that the product is in stock at a time at which a second period longer than the first period elapses after the notification device sends the first message, the notification device may resend the first message to the user.

In the server according to the above-described aspect, the message service may include a plurality of types of message services, and the notification device may be allowed to use one of the plurality of types of message services, and may use the message service different from the message service used previous time, in resending the first message.

In the server according to the above-described aspect, the notification device may resend the first message to the user via another message service disabled from discriminating whether a message sent to a destination has been read.

In the server according to the above-described aspect,
the determination device may determine again whether the product is in stock when the first message remains unread for a certain period after the first message is resent to the user,
the finalization device may finalize purchase of the product by the user when the determination device determines that the product is in stock while the resent first message is unread, and
the cancellation device may cancel the reservation when the determination device determines that the product is out of stock while the resent first message is unread.

In the server according to the above-described aspect, when the first message remains unread at a time at which a first period elapses after the first message is resent, and the determination device determines that the product is in stock at a time at which a second period longer than the first period elapses after the first message is resent, the finalization device may finalize purchase of the product by the user.

The server according to the above-described aspect may further include a prediction device that predicts a prospect value for restocking of the product that has been sold out, wherein
when the determination device determines that the product is out of stock, if the prospect value predicted by the prediction device is larger than a reference value, the notification device may send the second message including the object to the user, and if the prospect value is equal to or smaller than the reference value, the notification device may send the second message not including the object to the user, and
the cancellation device may cancel the reservation when the object included in the second message is operated after the second message including the object is sent, or when the second message not including the object is sent.

A reservation confirmation method according to a second aspect of the present disclosure is provided as a reservation confirmation method executed by a server that uses a message service enabled to discriminate whether a message sent to a destination has been read, the method including:
a notification step of sending a first message including an object for canceling reservation of a product reserved by a user to the user via the message service when the product arrives;
a cancellation step of canceling the reservation when the object is operated by the user in a predetermined time after the first message is marked as read;
a determination step of determining whether the product is in stock when the object remains unoperated for the predetermined time after the first message is marked as read; and
a finalization step of finalizing purchase of the product by the user when it is determined in the determination step that the product is in stock,
wherein in the notification step, a second message notifying that the product has been sold out is sent to the user when it is determined in the determination step that the product is out of stock.

A program according to a third aspect of the present disclosure causes a computer, which uses a message service enabled to discriminate whether a message sent to a destination has been read, to function as:
a notification device that sends a first message including an object for canceling reservation of a product reserved by a user to the user via the message service when the product arrives;
a cancellation device that cancels the reservation when the object is operated by the user in a predetermined time after the first message is marked as read;
a determination device that determines whether the product is in stock when the object remains unoperated for the predetermined time after the first message is marked as read; and
a finalization device that finalizes purchase of the product by the user when the determination device determines that the product is in stock,
wherein the notification device sends a second message notifying that the product has been sold out to the user when the determination device determines that the product is out of stock.

The above-described program can be distributed and sold via a computer communication network, independently of the computer that executes this program.

An information recording medium that records the above-described program is implemented as a non-transitory recording medium, and can be distributed and sold independently of the computer. The non-transitory recording medium means herein a tangible recording medium. Examples of the non-transitory recording medium include a compact disk, a flexible disk, a hard disk, a magneto-optical disk, a digital video disk, a magnetic tape, and a semiconductor memory. A transitory recording medium means a transmission medium (propagation signal) itself. Examples of the transitory recording medium include an electrical signal, an optical signal, and an electromagnetic wave. Note that a temporary storage area serves as an area for temporarily storing data and programs, and is implemented as, for example, a volatile memory such as a random access memory (RAM).

ADVANTAGEOUS EFFECTS OF INVENTION

The present disclosure can provide an opportunity for a user to confirm purchase of a reserved product.

BRIEF DESCRIPTION OF DRAWINGS

FIG. 5 is a schematic diagram illustrating exemplary reservation management information;

FIG. 10 is a flowchart for explaining reservation confirmation processing according to the present embodiment.

DESCRIPTION OF EMBODIMENTS

An embodiment of the present disclosure will be described below. A product sales system suitable for a sales site (shopping mall site) formed by a collection of various stores or shops (virtual stores or shops) will be taken as an example in the embodiment of the present disclosure. The case where a message (a first message and/or the like, notifying that a product reserved by a user has arrived, as will be described later) is sent to the user via a message service enabled to discriminate whether a message sent to a destination has been read will be described below, but this case is merely an example, and the contents of the message may be sent by email using an email system enabled to discriminate whether the message has been read, as will be described later.

In other words, the following embodiments will be given for explanatory purposes, and do not limit the scope of the invention. Embodiments in which each or all of the elements of the following embodiments are replaced with equivalents, therefore, can be employed by those skilled in the art, and these embodiments are included in the scope of the invention as well.

Entire Configuration

Figure 1:
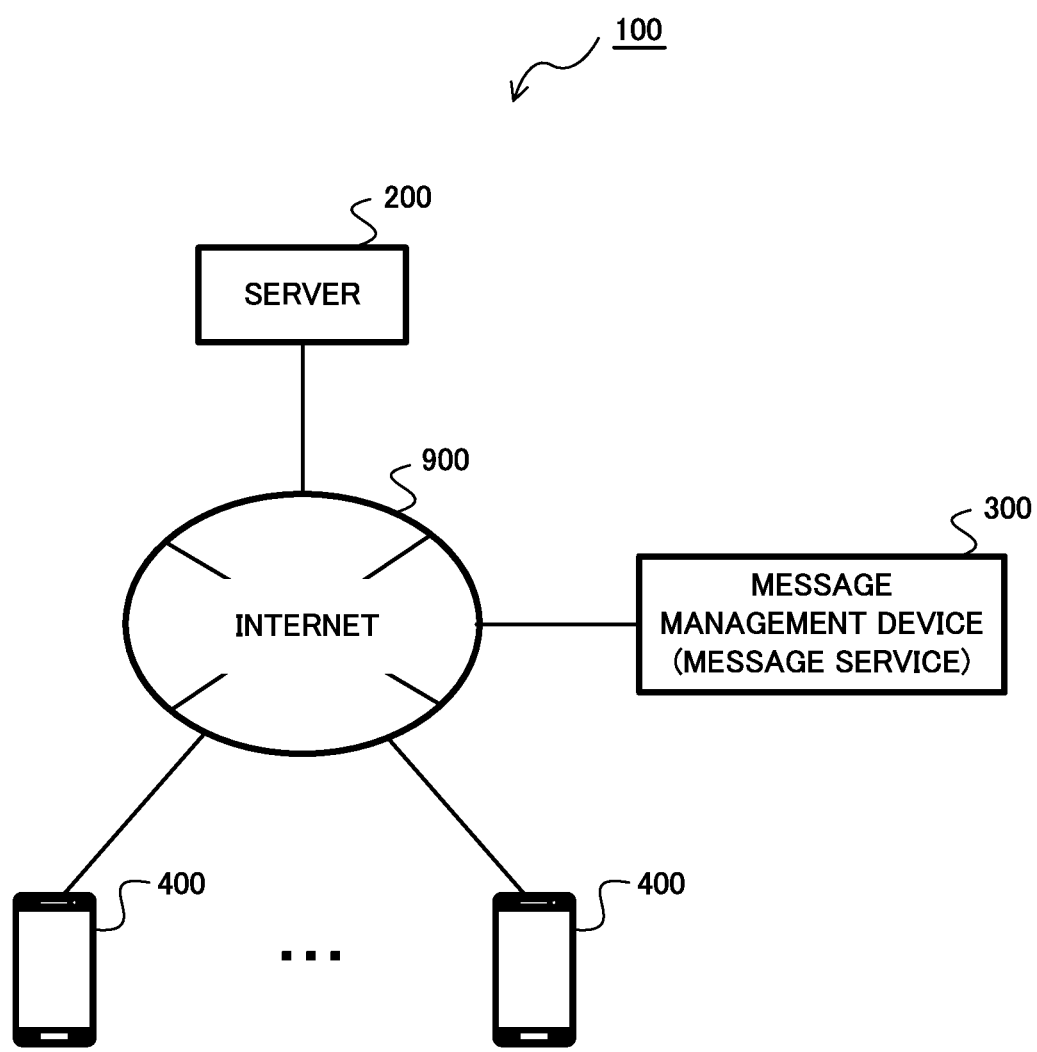
FIG. 1 is a block diagram illustrating an exemplary entire configuration of a product sales system according to the present embodiment.

A product sales system 100 according to an embodiment of the present disclosure is formed by connecting to each other via the Internet 900, a server 200 that sells a product, a message management device 300 that provides a message service, and a user terminal 400 used by a user, as illustrated in FIG. 1. Although a simple illustration is provided in FIG. 1, a large number of user terminals 400 are assumed to be present depending on the number of users who use the system. Only one message management device 300 is illustrated in FIG. 1, but a plurality of message management devices 300 (different message services) may be selectively used, as will be described later.

The server 200 is implemented as, for example, a computer for a server, and manages the overall sales processes of a product. More specifically, when a purchase reservation operation is performed for a sold-out product from a user, the server 200 prompts the user, who has made a reservation by sending a message, to confirm the reservation when the product arrives.

The message management device 300 serves as, for example, a device that provides a message service for exchanging messages between phone numbers or service IDs (user IDs or the like in the message service) serving as destinations, using short message service (SMS). Note that the message management device 300 is enabled to determine whether a message sent to a destination has been read.

To send a message to a user via the message service provided by the message management device 300, the above-mentioned server 200 can discriminate whether the user has read the message (whether the message is already read or unread) and thus appropriately confirm the reservation.

The user terminal 400, for example, is implemented as a smartphone or the like, and installed with a shopping application, a message application, and the like.

A user who uses such a user terminal 400, for example, starts (executes) the shopping application, accesses the server 200, and purchases or reserves a product, or the like. The user also starts the message application, and exchanges messages with other users and/or the like (including the server 200) using the message management device 300 (message service).

The user may even start a browser (browser application) installed on the user terminal 400, access the server 200, and purchase or reserve the product, or the like.

Schematic Configuration of Information Processor

A typical information processor 500 that implements the server 200 and the user terminal 400 according to the embodiment of the present disclosure will be described below.

Figure 2:
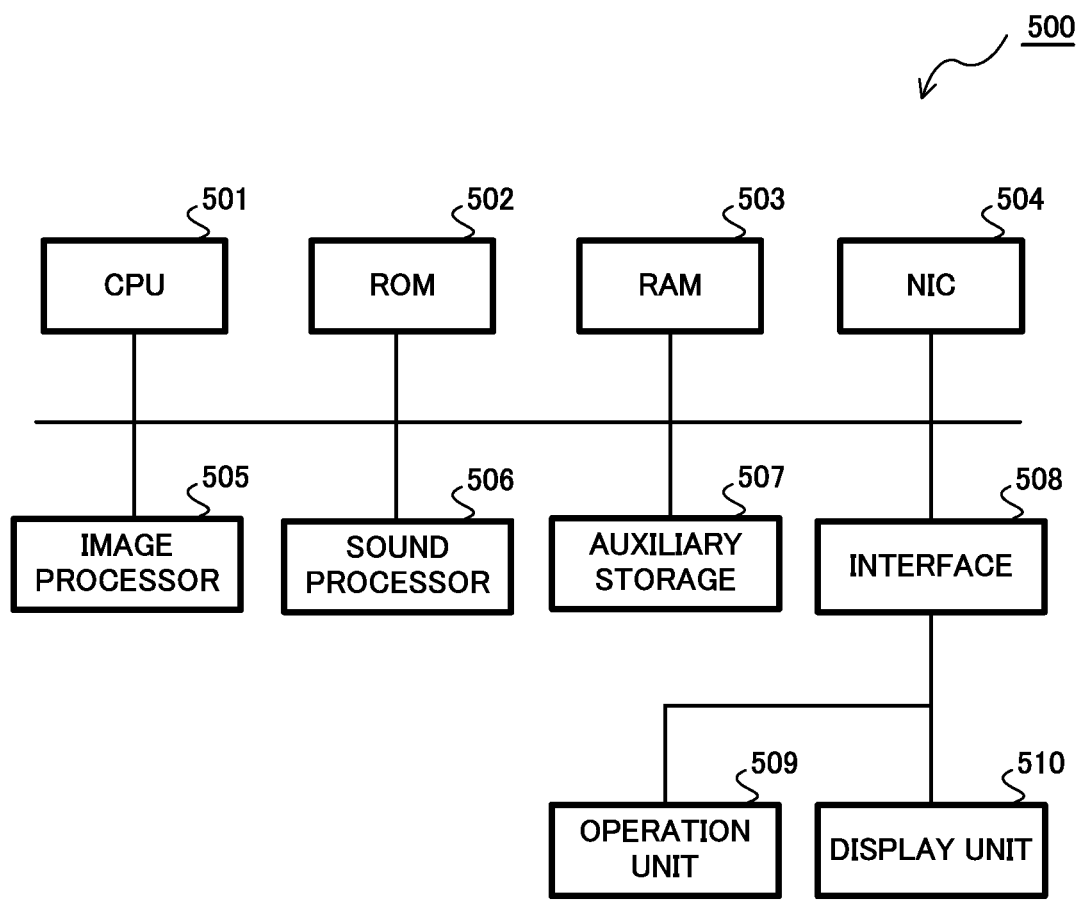
FIG. 2 is a block diagram illustrating an exemplary schematic configuration of a typical information processor that implements a server and a user terminal.

The information processor 500 includes a central processing unit (CPU) 501, a read only memory (ROM) 502, a random access memory (RAM) 503, a network interface card (NIC) 504, an image processor 505, a sound processor 506, an auxiliary storage 507, an interface 508, an operation unit 509, and a display unit 510, as illustrated in FIG. 2.

The CPU 501 controls the operation of the overall information processor 500, is connected to each component, and exchanges control signals and data with these components.

The ROM 502 records an initial program loader (IPL) executed immediately after power-on, and by executing the IPL, a program stored in the auxiliary storage 507 is read to the RAM 503 and starts to be executed by the CPU 501.

The RAM 503 serves to temporarily store data and programs, and holds programs and data read from the auxiliary storage 507, other data required in communication, and/or the like.

The NIC 504 serves to connect the information processor 500 to a computer communication network such as the Internet, and is implemented as an NIC compliant with the 10BASE-T or 100BASE-T standard used in forming a local area network (LAN), an analog modem for connection to the Internet using a telephone line, an integrated services digital network (ISDN) modem, an asymmetric digital subscriber line (ADSL) modem, a cable modem for connection to the Internet using a cable television line, or the like.

The image processor 505 uses an image arithmetic processor (not illustrated) provided in the CPU 501 or the image processor 505 to process image data read from the auxiliary storage 507 and/or the like, and records the processed image data in a frame memory (not illustrated) provided in the image processor 505. The image information recorded in the frame memory is converted into a video signal at a predetermined synchronization timing, and output to the exterior via the interface 508 or the like. Note that when the information processor 500 includes an internal display, the image processor 505 outputs the converted video signal to the display. In other words, the image processor 505 generates an image required in the course of processing performed by the information processor 500 and displays the image on an internal or external display, under the control of the CPU 501.

The sound processor 506 converts music data or voice data read from the auxiliary storage 507 and/or the like into an audio signal, and outputs the audio signal to the exterior via the interface 508 or the like. Note that when the information processor 500 includes an internal loudspeaker, the sound processor 506 outputs the converted audio signal to the loudspeaker. In other words, the sound processor 506 generates a musical sound or a voice to be produced in the course of processing performed by the information processor 500 and outputs the musical sound or the like from an internal or external loudspeaker, under the control of the CPU 501.

The auxiliary storage 507 is implemented as a hard disk, a solid state drive (SSD), or the like, and stores various programs and various data required in operation control of the overall information processor 500. The auxiliary storage 507, for example, stores a program for implementing the server 200 and/or the like according to the embodiment. The auxiliary storage 507 reads the stored programs and data as appropriate and temporarily stores these programs and data in the RAM 503 or the like, under the control of the CPU 501.

The interface 508, for example, is based on a standard such as HDMI® or universal serial bus (USB), and connected to the operation unit 509 and the display unit 510. The interface 508 may even exchange required information with an external device connected to the interface 508.

The operation unit 509 accepts operation input by an operator and/or the like who uses the information processor 500.

The display unit 510 renders an image corresponding to the image data output from the image processor 505, and presents the image to an operator and/or the like who uses the information processor 500.

The information processor 500 may even include a drive unit for a digital versatile disc (DVD)-ROM or the like, in place of the auxiliary storage 507. In this case, the information processor 500 reads programs and data from the DVD-ROM or the like mounted on the drive unit, and operates similarly to the above-mentioned operation.

The functional configuration and the like of the server 200 implemented in the above-mentioned information processor 500 will be described below with reference to FIGS. 3 to 7. When the information processor 500 is powered on and thus enabled to communicate with, for example, the user terminal 400, a program for causing the information processor 500 to function as the server 200 according to the present embodiment is executed to implement the server 200 according to the present embodiment.

Note that the user terminal 400 is similarly implemented by the information processor 500, as will be described later.

Functional Configuration of Server 200

Figure 3:
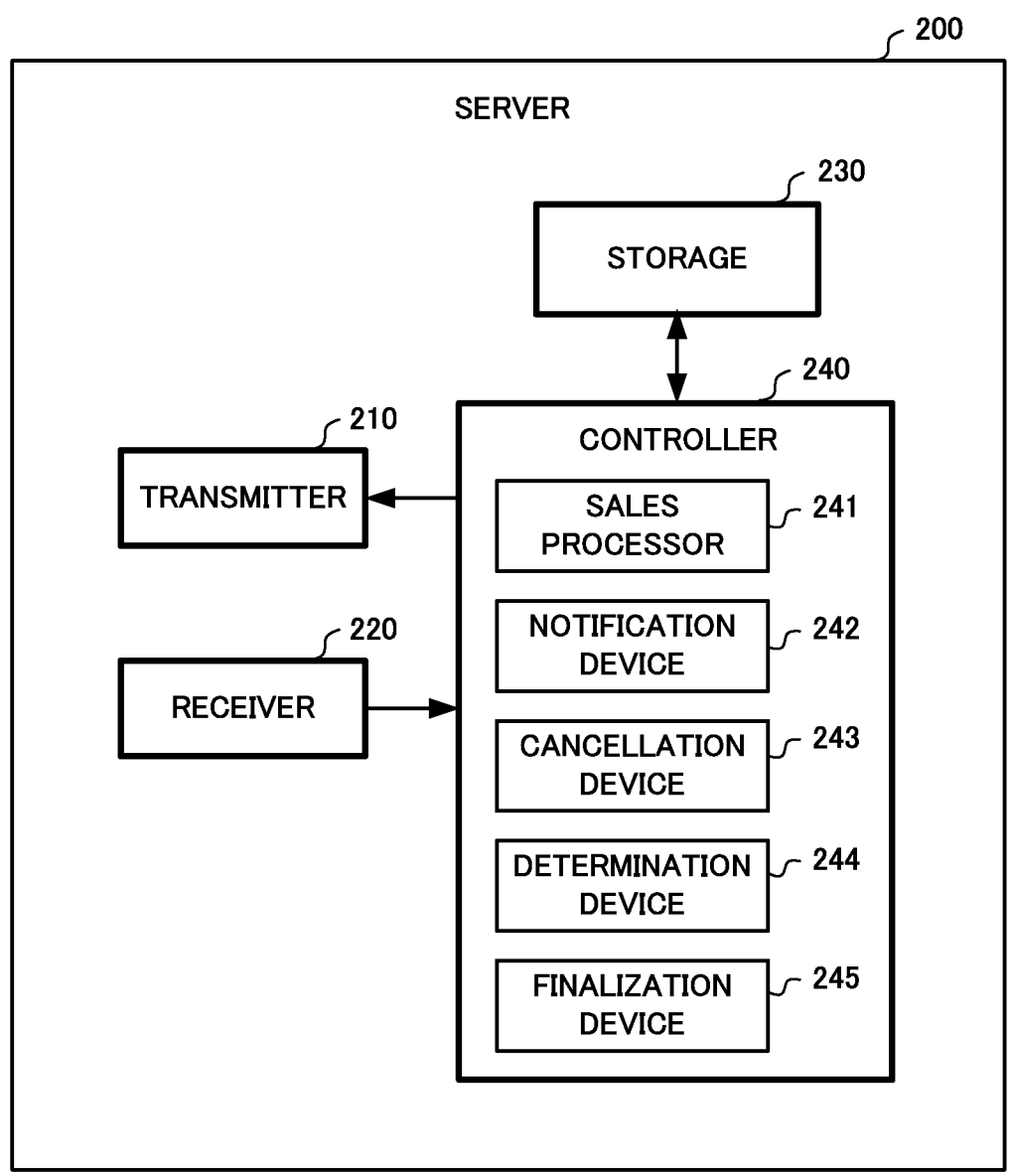
FIG. 3 is a block diagram illustrating an exemplary functional configuration of the server according to the present embodiment.

FIG. 3 is a block diagram illustrating an exemplary functional configuration of the server 200 according to the present embodiment. The server 200 includes a transmitter 210, a receiver 220, a storage 230, and a controller 240, as illustrated in FIG. 3.

The transmitter 210 transmits required information to the user terminal 400 and/or the like via the Internet 900.

The transmitter 210, for example, is controlled by the controller 240 (a notification device 242 (to be described later)), and transmits a message to the user terminal 400 (to the user) via the message service (message management device 300).

The transmitter 210 transmits a product page and/or the like to the user terminal 400 in response to access from the user terminal 400.

The above-mentioned NIC 504 can function as such a transmitter 210.

The receiver 220 receives information sent from the user terminal 400 and/or the like via the Internet 900.

For example, when the above-mentioned transmitter 210 transmits a message to the user terminal 400, and an operation is performed on the message (a cancel button (to be described later)) by the user, the receiver 220 receives information concerning the operation.

The receiver 220 receives instruction information such as purchase or reservation of a product, or the like sent from the user terminal 400.

The above-mentioned NIC 504 can function as such a receiver 220.

The storage 230, for example, stores user management information for managing a user who purchases or reserves a product, or the like, and reservation management information for managing the reservation of the product.

Figure 4:
FIG. 4 is a schematic diagram illustrating exemplary user management information.

The storage 230, for example, stores user management information 231 as illustrated in FIG. 4.

The user management information 231 includes, as one example, a user ID 231*a*, a full name 231*b*, a date of birth 231*c*, a gender 231*d*, an address 231*e*, and a service ID 231*f*, as illustrated in FIG. 4.

Note that the service ID 231*f* refers to identification information of a user in a message service used by the user. In other words, in the message service, by specifying the service ID 231*f* as a destination and sending a message, the message can be received by the user terminal 400 of the user. When the user uses a plurality of types of message services, a plurality of pieces of information is managed in the service ID 231*f*. In this case, the pieces of information are assumed to be managed as appropriate in correspondence with information for identifying the respective message services.

The phone number of the user terminal 400 may even be managed in place of such a service ID 231*f*, and a message may be sent to the user terminal 400 using this phone number as a destination in each message service.

The storage 230 stores reservation management information 232 as illustrated in FIG. 5.

The reservation management information 232 includes, as one example, a product ID 232*a*, a user ID 232*b*, a date and time of transmission 232*c*, a date and time of reading 232*d*, and a status 232*e*, as illustrated in FIG. 5.

Note that the date and time of transmission 232*c* represents the date and time at which a message (a first message (to be described later)) notifying that a reserved product has arrived is transmitted to the user. The date and time of transmission 232*c* is therefore blank before the reserved product arrives. The date and time of reading 232*d* represents the date and time at which the transmitted message is read by the user. The date and time of reading 232*d* is therefore blank before the message is read by the user.

The status 232*e* represents a state regarding reservation or a state regarding a message.

The storage 230 further stores product management information for managing arrival, a quantity of stock, and the like for a product.

The above-mentioned auxiliary storage 507 and/or the like can function as such a storage 230.

Referring back to FIG. 3, the controller 240 controls the overall server 200.

The controller 240 includes, for example, a sales processor 241, a notification device 242, a cancellation device 243, a determination device 244, and a finalization device 245.

The sales processor 241 accepts purchase or reservation of a product in response to requests from the user terminal 400, and performs processing that depends on the requests.

Figure 6:
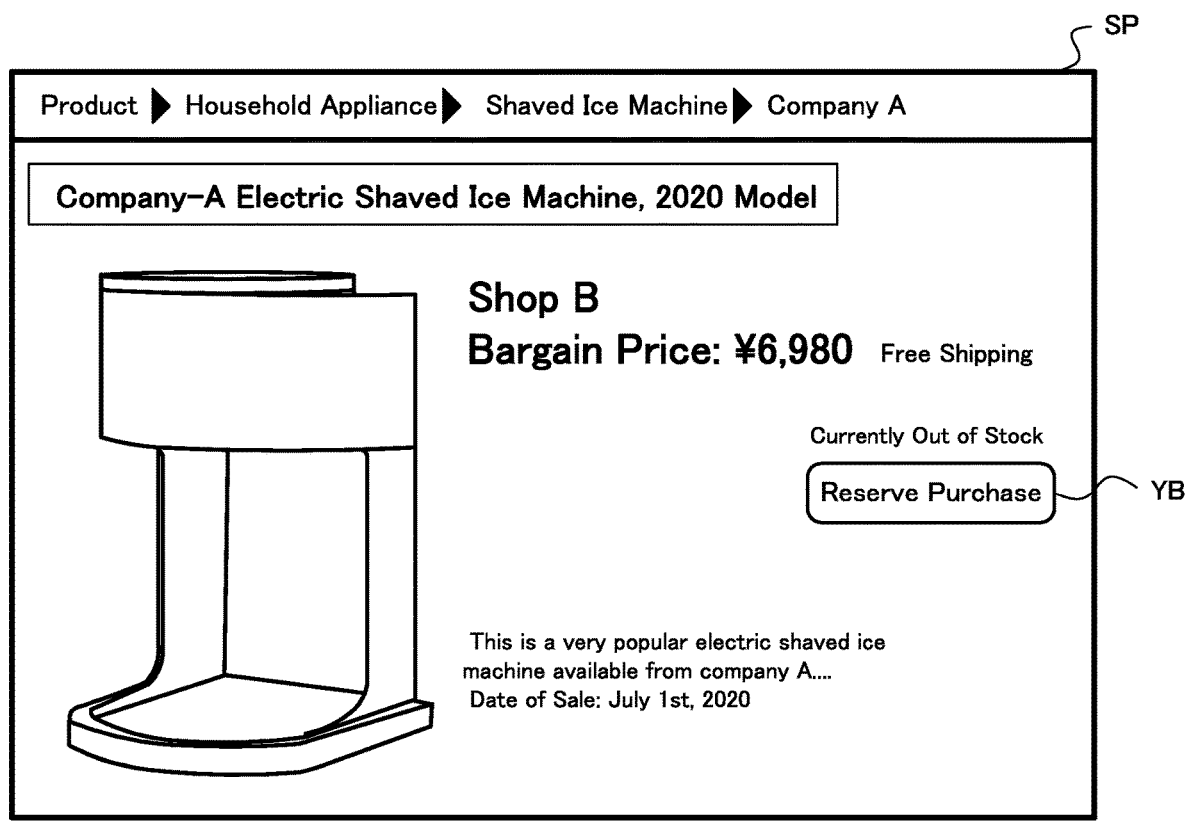
FIG. 6 is a schematic diagram illustrating an exemplary product page when a product is sold out.

The sales processor 241, for example, generates a product page, displays the product page on the user terminal 400 serving as an access source, and accepts purchase or reservation of a product. More specifically, when a product is sold out, the sales processor 241 generates a product page SP as illustrated in FIG. 6. In other words, the sales processor 241 generates a product page SP having a purchase reservation button YB set in place of a purchase button that has been set before sell-out, and displays the product page SP on the user terminal 400.

When the purchase reservation button YB is pressed (touched) by a user who needs to wait for the product to arrive, but nonetheless wants to purchase the product, the sales processor 241 adds information concerning the user to the reservation management information 232 as illustrated in FIG. 5 described above, and manages the information.

Referring back to FIG. 3, when the product reserved by the user arrives, the notification device 242 sends a first message including an object for canceling the reservation of the product to the user via the message service.

Figure 7:
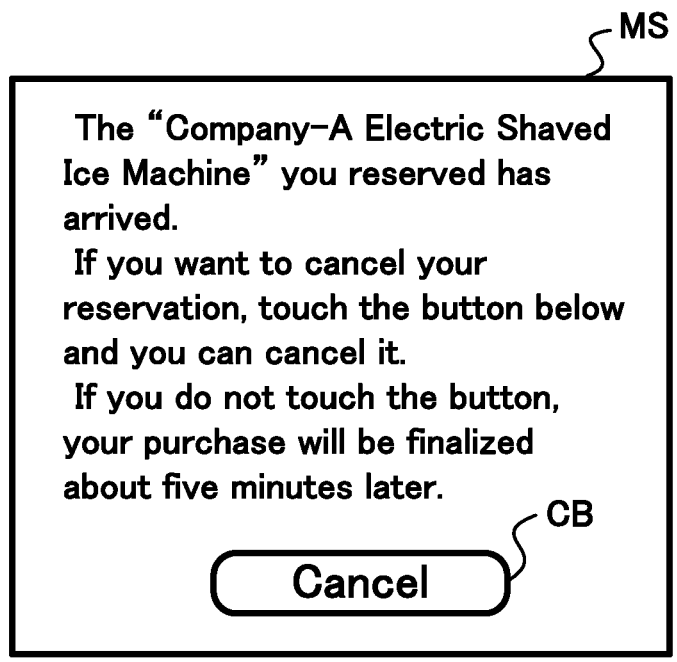
FIG. 7 is a schematic diagram illustrating an exemplary message sent to a user when a reserved product arrives.

More specifically, the notification device 242 generates a first message MS for notifying that the reserved product has arrived, as illustrated in FIG. 7. The first message MS includes a cancel button CB. The cancel button CB is pressed when the user wants to cancel the reservation. Note that such a cancel button CB is merely an example, and a checkbox or the like may even be used. In other words, the first message MS need only include an object for canceling the reservation, and the specific details of the object can be changed as appropriate.

The notification device 242 refers to the reservation management information 232 as illustrated in FIG. 5 described above (more specifically, refers to the user management information 231 illustrated in FIG. 4 as well), and sends the first message MS to each user who has reserved the same product.

As will be described later, when the determination device 244 determines that the product is out of stock, the notification device 242 sends a second message notifying that the product has been sold out to the user via the message service.

The notification device 242 resends the first message to the user when the determination device 244 (to be described later) determines that the product is in stock after a certain period elapses while the first message sent first remains unread. In doing this, the notification device 242 may resend the first message using a message service different from the message service used previous time.

Referring back to FIG. 3, the cancellation device 243 cancels the reservation when the object included in the first message is operated in a predetermined time after the first message sent by the above-mentioned notification device 242 is marked as read.

For example, when the first message MS illustrated in FIG. 7 described above is sent to the user, and the user presses the cancel button CB in five minutes after reading the first message MS, the cancellation device 243 cancels the reservation. Note that "in five minutes" is merely an example, and other times ("in 10 minutes" or the like) may be set.

As for the detailed description of the reservation cancellation, the cancellation device 243 updates the status 232e of a relevant user to "Canceled" in the reservation management information 232 illustrated in FIG. 5 described above, and excludes the user from targets for management of reservation. Note that the relevant user may be excluded from the targets for management by deleting information concerning this user from the reservation management information 232.

The determination device 244 determines whether the product (reserved product) is in stock when the object included in the first message remains unoperated for a predetermined time after the first message is marked as read.

For example, when the first message MS illustrated in FIG. 7 described above is sent to the user, and five minutes elapse (overrun) while the cancel button CB remains unpressed after the user reads the first message MS, the determination device 244 determines whether the product is in stock. Note that "in five minutes" is merely an example, and other times may be set, as described above.

In other words, since the above-mentioned notification device 242 sends the first message MS to each user who has reserved the same product, the product may be sold out again, depending on the relationship between the number of people who have made reservations and the number of items that have arrived. Therefore, the determination device 244 determines whether the product is in stock at the current point of time.

The determination device 244 determines whether the product is in stock after a certain period (as one example, "two days" is set, but other periods may be set) elapses while the first message sent by the above-mentioned notification device 242 remains unread.

The finalization device 245 finalizes purchase of the product by the user if the above-mentioned determination device 244 determines that the product is in stock when the object included in the first message remains unoperated for a predetermined time after the first message is marked as read.

In other words, the finalization device 245 finalizes purchase of the product by the user when the product is in stock at the time at which five minutes elapse while the cancel button CB remains unpressed after the first message MS as illustrated in FIG. 7 is marked as read.

As for the detailed description of the purchase finalization, the finalization device 245 updates the status 232e of a relevant user to "Purchase Finalized" in the reservation management information 232 illustrated in FIG. 5 described above, and excludes the user from targets for management of reservation. Note that the relevant user may be excluded from the targets for management by deleting information concerning this user from the reservation management information 232. The above-mentioned sales processor 241 performs processing such as instructions for purchase money settlement and product shipping.

The finalization device 245 may finalize purchase of the product by the re-notified user when the determination device 244 determines whether the product is in stock after a certain period elapses while the resent first message remains unread, and the determination device 244 determines that the product is in stock.

The controller 240 even generates an inquiry screen, updates the reservation management information 232 illustrated in FIG. 5, and/or the like, in response to an inquiry request for the reserved product or a cancel instruction for the reserved product (a spontaneous cancel instruction from the user).

The above-mentioned CPU 501 and/or the like can function as the controller 240 having such a configuration.

(Functional Configuration of User Terminal 400)

Figure 8:
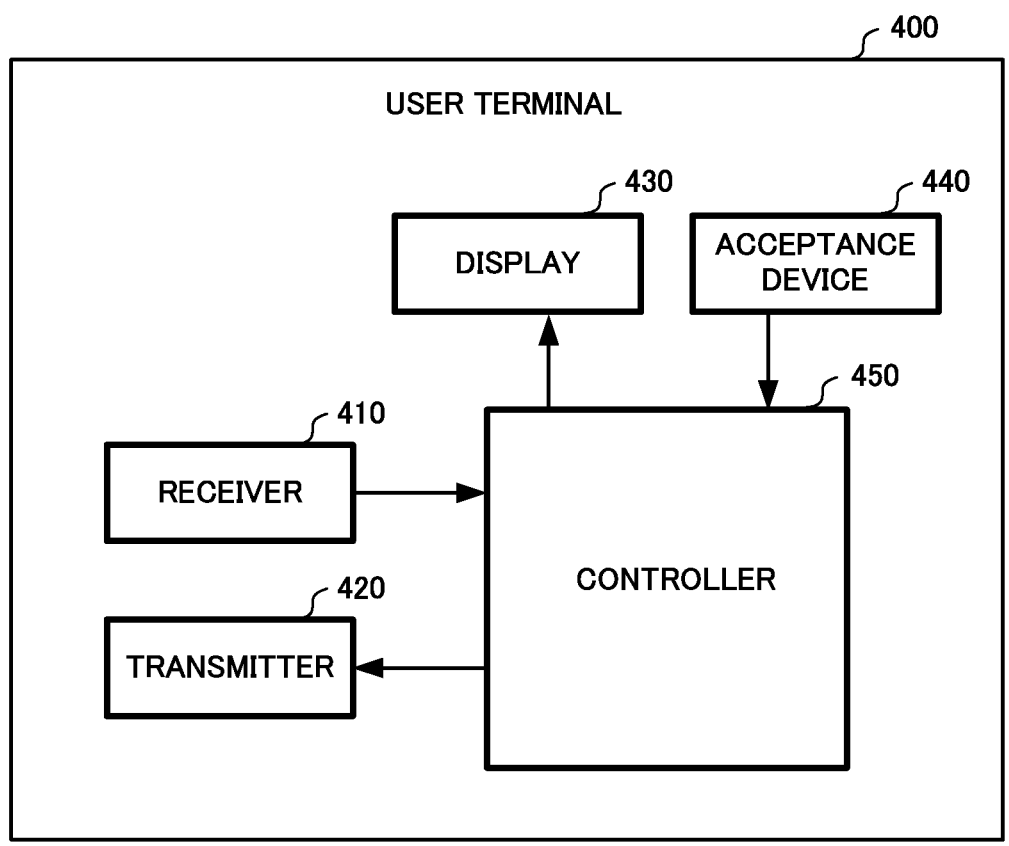
FIG. 8 is a block diagram illustrating an exemplary functional configuration of a user terminal according to the present embodiment.

FIG. 8 is a block diagram illustrating an exemplary functional configuration of the user terminal 400 according to the present embodiment. The user terminal 400 includes a receiver 410, a transmitter 420, a display 430, an acceptance device 440, and a controller 450, as illustrated in FIG. 8.

The receiver 410 receives information sent from the server 200 and the like via the Internet 900.

The receiver 410, for example, receives a first message sent from the server 200 via the message service (message management device 300). In other words, the user who uses the user terminal 400 receives the first message MS as illustrated in FIG. 7 described above, when the product reserved by the user arrives.

The above-mentioned NIC 504 can function as such a receiver 410.

The transmitter 420 transmits information directed to the server 200 and the like via the Internet 900.

For example, when the above-mentioned receiver 410 receives the first message MS as illustrated in FIG. 7, and the user reads the first message MS and operates the cancel button CB, the transmitter 420 transmits information concerning the operation (information indicating that the cancel button CB has been operated) to the server 200 as a reply via the message service.

The above-mentioned NIC 504 can function as such a transmitter 420.

The display 430 displays various types of information for informing the user.

Figure 9:
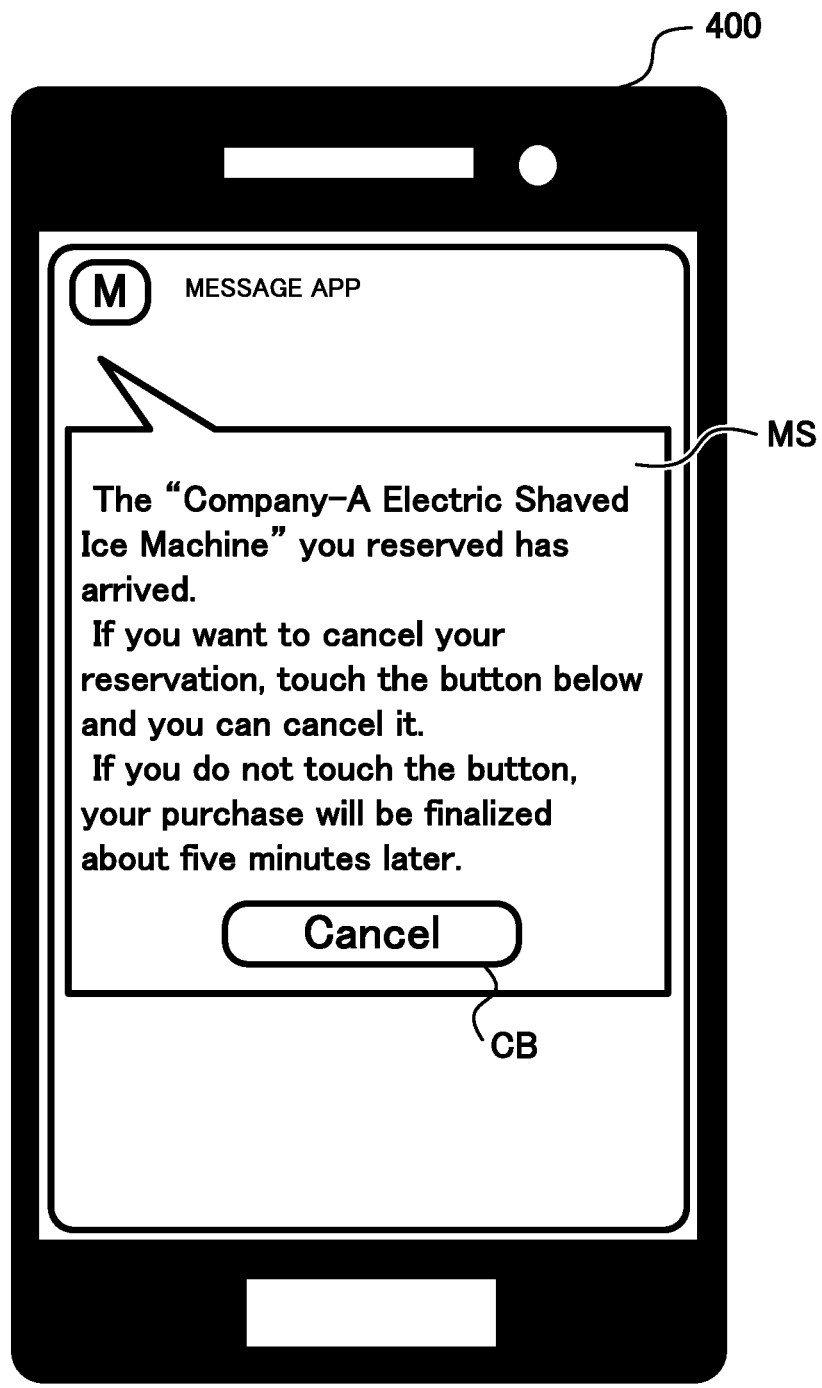
FIG. 9 is a schematic diagram illustrating an exemplary message displayed on the user terminal.

For example, in the state in which the above-mentioned receiver 410 has received the first message MS as illustrated in FIG. 7, when the user starts the message application, the display 430 displays the first message MS as illustrated in FIG. 9. The first message MS includes the cancel button CB, as described above.

Note that as in the case of FIG. 9, the first message MS is marked as read by being displayed on the display 430, and this information (information indicating that the first message MS has been marked as read) is transmitted to the server 200 via the message management device 300. While the first message MS remains to be displayed in this manner, the first message MS remains unread.

The above-mentioned display unit 510 can function as such a display 430.

Referring back to FIG. 8, the acceptance device 440 accepts an operation from the user.

The acceptance device 440, for example, is implemented as a touch panel superimposed on the display 430, and accepts an operation on the cancel button CB or the like when the first message MS as illustrated in FIG. 9 described above is displayed. In other words, when the user who has read the first message MS wants to cancel the reservation, the user presses the cancel button CB. When the cancel button CB is actually pressed, a cancel instruction for the product associated with the first message MS (the product that has arrived) is transmitted to the server 200 via the message management device 300.

The above-mentioned operation unit 509 can function as such an acceptance device 440.

The controller 450 controls the overall user terminal 400.

The controller 450, for example, starts the shopping application in response to a user operation, accesses the server 200, and purchases or reserves a product, or the like. Note that the controller 450 may start the browser in response to a user operation, access the server 200, and purchase or reserve a product, or the like.

The controller 450 similarly starts the message application in response to a user operation, and exchanges messages with other users and/or the like (including the server 200) using the message service. When, for example, the above-mentioned receiver 410 receives the first message MS as illustrated in FIG. 7 sent from the server 200, the controller 450 controls the above-mentioned display 430 to display the first message MS as illustrated in FIG. 9. When the above-mentioned acceptance device 440 accepts an operation on the cancel button CB (pressing of the cancel button CB), the controller 450 controls the above-mentioned transmitter 420 to transmit information indicating that the cancel button CB has been operated to the server 200 as a reply via the message service.

The above-mentioned CPU 501 and/or the like can function as such a controller 450.

(Operation of Server 200)

The operation of the server 200 in such a product sales system 100 will be described below with reference to FIG. 10. FIG. 10 is a flowchart illustrating the sequence of reservation confirmation processing performed by the server 200.

The reservation confirmation processing is started, for example, every time a product reserved by a user arrives.

The server 200 first transmits a first message notifying that a reserved product has arrived (step S11).

In other words, the controller 240 (notification device 242) sends the first message MS as illustrated in FIG. 7 to the user terminal 400 of the user, who has made a reservation, via the message service (message management device 300). The first message MS includes the cancel button CB.

The server 200 sets a date and time of transmission (step S12).

The controller 240, for example, sets the current date and time to the date and time of transmission 232c in the reservation management information 232 as illustrated in FIG. 5.

The server 200 discriminates whether the first message has been marked as read (step S13).

The controller 240, for example, discriminates whether the first message transmitted in step S11 described above has been displayed on the user terminal 400 serving as a destination, in accordance with information acquired from the message management device 300.

When the server 200 discriminates that the first message has been marked as read (Yes in step S13), the server 200 sets a date and time of reading (step S14).

The controller 240, for example, sets the current date and time to the date and time of reading 232d in the reservation management information 232 as illustrated in FIG. 5.

The server 200 discriminates whether a cancel button has been pressed (step S15).

The controller 240, for example, discriminates whether the cancel button CB has been pressed in the state in which the first message MS as illustrated in FIG. 9 is displayed on the user terminal 400 (display 430).

When the server 200 discriminates that the cancel button has not been pressed (No in step S15), the server 200 discriminates whether a predetermined time has elapsed (step S16).

The controller 240, for example, discriminates whether five minutes have elapsed since the date and time of reading set in step S14 described above.

When the server 200 discriminates that the predetermined time has not elapsed (No in step S16), the server 200 returns the process to step S15 described above.

When the server 200 discriminates in step S15 described above that the cancel button has been pressed (Yes in step S15), the server 200 cancels the reservation (step S17).

In other words, the controller 240 (cancellation device 243) cancels the reservation because the cancel button included in the first message has been pressed in the predetermined time after the first message is marked as read. The controller 240, for example, updates the status 232e of a relevant user to "Canceled," and excludes the user from targets for management of reservation, in the reservation management information 232 illustrated in FIG. 5.

The server 200 thus ends the reservation confirmation processing.

When the server 200 discriminates in step S16 described above that the predetermined time has elapsed (Yes in step S16), the server 200 determines whether the reserved product is in stock (step S18).

In other words, the controller 240 (determination device 244) determines whether the reserved product is in stock, because the predetermined time has elapsed while the cancel button remains unpressed after the first message is marked as read.

When the server 200 determines that the reserved product is in stock (Yes in step S18), the server 200 finalizes purchase of this product (step S19).

In other words, the controller 240 (finalization device 245) finalizes purchase of the product by the user who has made a reservation, because the reserved product is in stock at the time at which the predetermined time elapses while the cancel button remains unpressed after the first message is marked as read. The controller 240, for example, updates the status 232e of a relevant user to "Purchase Finalized," and excludes the user from targets for management of reservation, in the reservation management information 232 illustrated in FIG. 5. The controller 240 (sales processor 241) performs processing such as instructions for purchase money settlement and product shipping.

The server 200 thus ends the reservation confirmation processing.

When the server 200 determines that the reserved product is out of stock (No in step S18), the server 200 transmits a second message notifying that the product has been sold out (step S20).

In other words, the controller 240 (notification device 242) sends the second message to the user terminal 400 via the message service, because the product that has arrived has been purchased earlier (purchase of this product has been finalized earlier) by other users (another user who has similarly made a reservation).

The server 200 thus ends the reservation confirmation processing.

When the server 200 discriminates in step S13 described above that the first message has not been marked as read (is unread) (No in step S13), the server 200 discriminates whether a certain period has elapsed (step S21).

The controller 240, for example, discriminates whether two days have elapsed since the date and time of transmission set in step S11 described above.

When the server 200 discriminates that the certain period has not elapsed (No in step S21), the server 200 returns the process to step S13 described above.

When the server 200 discriminates that the certain period has elapsed (Yes in step S21), the server 200 determines whether the reserved product is in stock (step S22).

In other words, the controller 240 (determination device 244) determines whether the reserved product is in stock, because the certain period has elapsed while the first message remains unread.

When the server 200 determines that the reserved product is in stock (Yes in step S22), the server 200 retransmits the first message (step S23).

In other words, the controller 240 (notification device 242) resends the first message MS as illustrated in FIG. 7 to the user terminal 400 via the message service, because the reserved product is in stock at the time at which the certain period elapses while the first message remains unread. In doing this, the controller 240 may resend the first message using a message service different from the message service used previous time.

The server 200 thus ends the reservation confirmation processing.

When the server 200 determines that the reserved product is out of stock (No in step S22), the server 200 transmits a second message (step S24).

In other words, the controller 240 (notification device 242) sends a second message notifying that the product has been sold out to the user terminal 400 via the message service, because the reserved product is already out of stock.

The server 200 thus ends the reservation confirmation processing.

By such reservation confirmation processing, when the user no longer wishes to purchase at the time at which the first message notifying that the reserved product has arrived is sent, the user can cancel the reservation simply by pressing the cancel button included in the first message. On the other hand, when the user still wishes to purchase, the user can directly finalize purchase (when the product is in stock) simply by reading the first message, with no need for other operations.

As a result, an opportunity for a user to confirm purchase of a reserved product can be provided.

Other Embodiments

In the above-described embodiment, the case where no object such as a cancel button is included in the second message notifying that the product has been sold out has been described, but the second message may be sent to the user, including such an object, when it is highly probable that the product will be restocked.

The controller 240 in the server 200 illustrated in FIG. 3, for example, further includes a prediction device that predicts a prospect value for restocking of the product that has been sold out.

When the determination device 244 determines that the product is out of stock, if the prospect value predicted by the prediction device is larger than a reference value, the notification device 242 sends a second message including a cancel button to the user, and if the prospect value is equal to or smaller than the reference value, the notification device 242 sends a second message including no cancel button to the user.

The cancellation device 243 cancels the reservation when the cancel button included in the second message is pressed after the second message including the cancel button is sent, or when the second message including no cancel button is sent.

In other words, when it is highly probable that the product will be restocked, including a cancel button in the second message notifying that the product has been sold out, prior to sending of the first message at the time of restocking, allows the user who no longer wishes to purchase at this point of time to cancel the reservation.

In this case as well, an opportunity for a user to confirm purchase of a reserved product can be provided.

In the above-described embodiment, the case where the first message and/or the like is sent to the user via the message service has been described, but the contents of the first message and/or the like may be sent by email using an email system enabled to discriminate whether the message has been read.

In other words, the technique for sending the first message and/or the like is not limited to the above-mentioned message service, and other techniques may be used as long as the techniques are enabled to discriminate whether the message has been read.

In contrast to this, the second message and/or the like may be sent using other message systems (a general email message or the like) enabled to discriminate whether the message has been read. The notification device 242 may, for example, send the second message notifying that the product has been sold out, via other message systems disabled from discrimination. The notification device 242 may even send (resend) the first message via other message systems disabled from discrimination, only at the time of resending.

In the above-described embodiment, the case where the determination device 244 determines whether the product is in stock after a certain period elapses while the sent first message remains unread, and the notification device 242 resends the first message when the determination device 244 determines that the product is in stock has been described, but a period (first period) to discriminate whether the message is unread and a period (second period) to determine whether the product is in stock may be separated from each other. Note that the second period is assumed to be longer than the first period.

For example, when the first message remains unread at the time at which the first period elapses after the notification device 242 sends the first message, and the determination device 244 determines that the product is in stock at the time at which the second period elapses after the notification device 242 sends the first message, the notification device 242 may resend the first message.

In the above-described embodiment, the case where the determination device 244 determines whether the product is in stock after the certain period elapses while the resent first message remains unread, and the finalization device 245 finalizes purchase of the product by the re-notified user when the determination device 244 determines that the product is in stock has been described, but a period (first period) to discriminate whether the message is unread and a period (second period) to determine whether the product is in stock may be separated from each other. Note that the second period is assumed to be longer than the first period, similarly to the above-mentioned case.

For example, when the first message remains unread at the time at which the first period elapses after the first message is resent, and the determination device 244 determines that the product is in stock at the time at which the second period elapses after the first message is resent, the finalization device 245 may finalize purchase of the product by the re-notified user.

As described above, the present disclosure can provide a server, a reservation confirmation method, and a program that can provide an opportunity for a user to confirm purchase of a reserved product.

REFERENCE SIGNS LIST

100 Product sales system
200 Server
210 Transmitter
220 Receiver
230 Storage
240 Controller
241 Sales processor
242 Notification device
243 Cancellation device
244 Determination device
245 Finalization device
300 Message management device
400 User terminal
410 Receiver
420 Transmitter
430 Display
440 Acceptance device
450 Controller
500 Information processor
501 CPU
502 ROM
503 RAM
504 NIC
505 Image processor
506 Sound processor
507 Auxiliary storage
508 Interface
509 Operation unit
510 Display unit
900 Internet

The invention claimed is:

1. A server that uses a message service enabled to discriminate whether a message sent to a destination has been read, the server comprising:
 at least one memory configured to store computer program code; and
 at least one processor configured to operate as instructed by the computer program code, the computer program code including:
 sales processing code configured to cause at least one of the at least one processors to accept a reservation of a product in response to a reservation request received from a user device;
 notification code configured to cause at least one of the at least one processors to, based on the reserved product arriving:
  generate a first message including an interactive object to be displayed on the user device for canceling the reservation of the product reserved by a user; and
  send the first message including the interactive object to the user via the message service;
 first determination code configured to cause at least one of the at least one processors to determine whether the first message including the interactive object has been marked as read;
 receiver code configured to cause at least one of the at least one processors to receive instruction information from the user device regarding the reserved product in response to the interactive object being operated by the user of the user device;
 cancellation code configured to cause at least one of the at least one processors to cancel the reservation when the instruction information indicates that the interactive object is operated by the user on the user device in a predetermined time after the first message is determined to be marked as read;
second determination code configured to cause at least one of the at least one processors to determine whether the product is in stock when the interactive object remains unoperated on the user device for the predetermined time after the first message is determined to be marked as read; and
finalization code configured to cause at least one of the at least one processors to finalize purchase of the product by the user when the product is determined to be in stock,
wherein the notification code is further configured to cause at least one of the at least one processors to send a second message notifying that the product has been sold out to the user when the product is determined to be out of stock.

2. The server according to claim 1, wherein the notification code is further configured to cause at least one of the at least one processors to send the second message to the user via another message service disabled from discriminating whether a message sent to a destination has been read.

3. The server according to claim 1, wherein
the second determination code is further configured to cause at least one of the at least one processors to determine whether the product is in stock when the first message remains unread for a certain period after the first message is sent to the user, and
the notification code is further configured to cause at least one of the at least one processors to resend the first message to the user when the determination device determines that the product is in stock while the first message is unread.

4. The server according to claim 3, wherein when the first message remains unread at a time at which a first period elapses after the notification device sends the first message, and the product is determined to be in stock at a time at which a second period longer than the first period elapses after the notification device sends the first message, the notification code is further configured to cause at least one of the at least one processors to resend the first message to the user.

5. The server according to claim 3, wherein the message service comprises a plurality of types of message services, and
the notification code is further configured to cause at least one of the at least one processors to be allowed to use one of the plurality of types of message services, and to use a message service different from a message service used in a previous time, in resending the first message.

6. The server according to claim 3, wherein the notification code is further configured to cause at least one of the at least one processors to resend the first message to the user via another message service disabled from discriminating whether a message sent to a destination has been read.

7. The server according to claim 3, wherein
the second determination code is further configured to cause at least one of the at least one processors to determine again whether the product is in stock when the first message remains unread for a certain period after the first message is resent to the user,
the finalization code is further configured to cause at least one of the at least one processors to finalize purchase of the product by the user when the product is determined to be in stock while the resent first message is unread, and
the cancellation code is further configured to cause at least one of the at least one processors to cancel the reservation when the product is determined to be out of stock while the resent first message is unread.

8. The server according to claim 7, wherein when the first message remains unread at a time at which a first period elapses after the first message is resent, and the product is determined to be in stock at a time at which a second period longer than the first period elapses after the first message is resent, the finalization code is further configured to cause at least one of the at least one processors to finalize a purchase of the product by the user.

9. The server according to claim 1, further comprising a prediction code configured to cause at least one of the at least one processors to predict a prospect value for restocking of the product that has been sold out, wherein
when the product is determined to be out of stock, if the prospect value predicted by the prediction device is larger than a reference value, the notification code is further configured to cause at least one of the at least one processors to send the second message including the interactive object to the user, and if the prospect value is not more than the reference value, the notification code is further configured to cause at least one of the at least one processors to send the second message not including the interactive object to the user, and
the cancellation code is further configured to cause at least one of the at least one processors to cancel the reservation in one of a case where the interactive object included in the second message is operated after the second message including the interactive object is sent, and a case where the second message not including the interactive object is sent.

10. A reservation confirmation method executed by a server that uses a message service enabled to discriminate whether a message sent to a destination has been read, the method comprising:
accepting a reservation of a product in response to a reservation request from a user device;
based on the reserved product arriving:
generating a first message including an interactive object to be displayed on the user device for canceling the reservation of the product reserved by a user; and
sending the first message including the interactive object to the user via the message service;
determining whether the first message including the interactive object has been marked as read;
canceling the reservation in response to receiving instruction information from the user device indicating that the interactive object is operated by the user on the user device in a predetermined time after the first message is determined to be marked as read;
determining whether the product is in stock when the interactive object remains unoperated on the user device for the predetermined time after the first message is determined to be marked as read; and
finalizing purchase of the product by the user when it is determined that the product is in stock,
wherein a second message notifying that the product has been sold out is sent to the user when it is determined that the product is out of stock.

11. A program for causing a computer, which uses a message service enabled to discriminate whether a message sent to a destination has been read, to function as:
- a sales processor that accepts a reservation of a product in response to a reservation request received from a user device;
- a notification device that, based on the reserved product arriving:
  - generates a first message including an interactive object to be displayed on the user device for canceling the reservation of the product reserved by a user; and
  - sends the first message including the interactive object to the user via the message service;
- a receiver that receives instruction information from the user device regarding the reserved product in response to the interactive object being operated by the user of the user device;
- a first determination device that determines whether the first message including the interactive object has been read;
- a cancellation device that cancels the reservation when the instruction information indicates that the interactive object is operated by the user on the user device in a predetermined time after the first message is determined to be marked as read;
- a second determination device that determines whether the product is in stock when the interactive object remains unoperated on the user device for the predetermined time after the first message is determined to be marked as read; and
- a finalization device that finalizes purchase of the product by the user when the determination device determines that the product is in stock,
- wherein the notification device sends a second message notifying that the product has been sold out to the user when the determination device determines that the product is out of stock.

* * * * *